April 3, 1951 D. J. BAKER 2,547,361

PICKUP HEAD USING TORSIONAL MOUNT FOR ARMATURES

Filed May 19, 1947 2 Sheets-Sheet 1

INVENTOR.
DONALD J. BAKER

BY Ralph B. Stewart

ATTORNEY.

April 3, 1951 D. J. BAKER 2,547,361

PICKUP HEAD USING TORSIONAL MOUNT FOR ARMATURES

Filed May 19, 1947 2 Sheets-Sheet 2

INVENTOR.
DONALD J. BAKER

BY Ralph B. Stewart

ATTORNEY.

Patented Apr. 3, 1951

2,547,361

UNITED STATES PATENT OFFICE 2,547,361

PICKUP HEAD USING TORSIONAL MOUNT FOR ARMATURES

Donald J. Baker, Los Angeles, Calif.

Application May 19, 1947, Serial No. 748,970

7 Claims. (Cl. 179—100.41)

This invention relates to a pickup head construction suitable for use with lateral cut records.

An object of the invention is to devise an improved construction which eliminates the pivotal bearing mounting of the armature commonly used in prior devices.

The armature in my pickup head is securely bonded to a torsional mounting element which eliminates all pivotal bearing elements subject to wear and requiring adjustment from time to time.

A further object is to devise a pickup head construction in which the pickup winding and the armature with its mounting are all constructed as a unit assembly which may be quickly and easily replaced in the magnetic system of the pickup.

Other objects will become apparent from the following description of the invention taken in connection with the accompanying drawing in which Figure 1 is a sectional view of the pickup head as taken in a vertical, longitudinal plane on a greatly enlarged scale;

Figure 1*a* shows the form of a stamped piece from which the pole pieces of the pickup may be formed;

Figure 9:
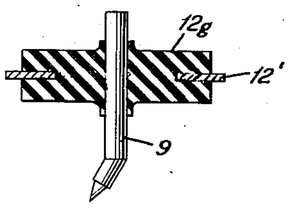
Figure 7:
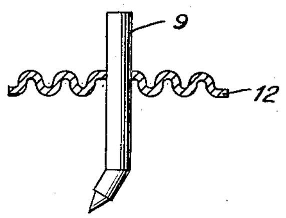
Figure 10:
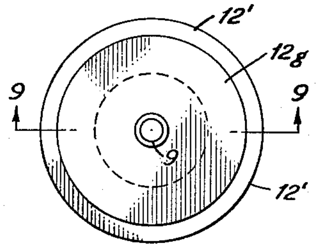
Figure 8:
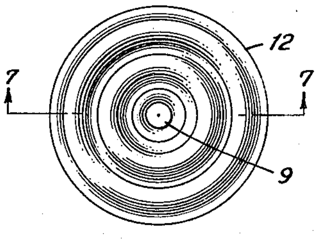

Figures 7 and 8 illustrate another arrangement for mounting the armature, Figure 7 being a sectional view of Figure 8 taken along the line 7—7; and Figures 9 and 10 illustrate still another arrangement for mounting the armature, Figure 9 being a sectional view of Figure 10 taken along the line 9—9.

Figure 3:
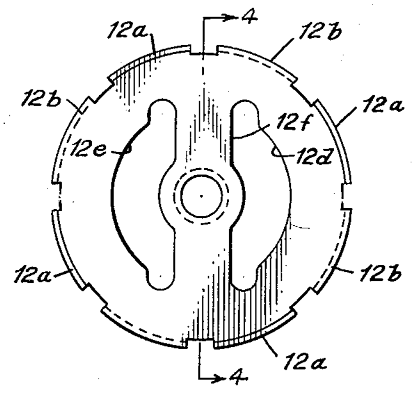
Figure 3 is a plan view of the armature mounting disk on a somewhat larger scale from Figures 1 and 2.
Figure 4:
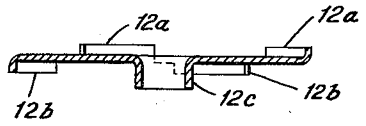
Figure 4 is a sectional view of Figure 3 taken along the line 4—4.

Figures 5 to 10, inclusive, are on a smaller scale than Figures 3 and 4.

Figures 1, 1A, 2:
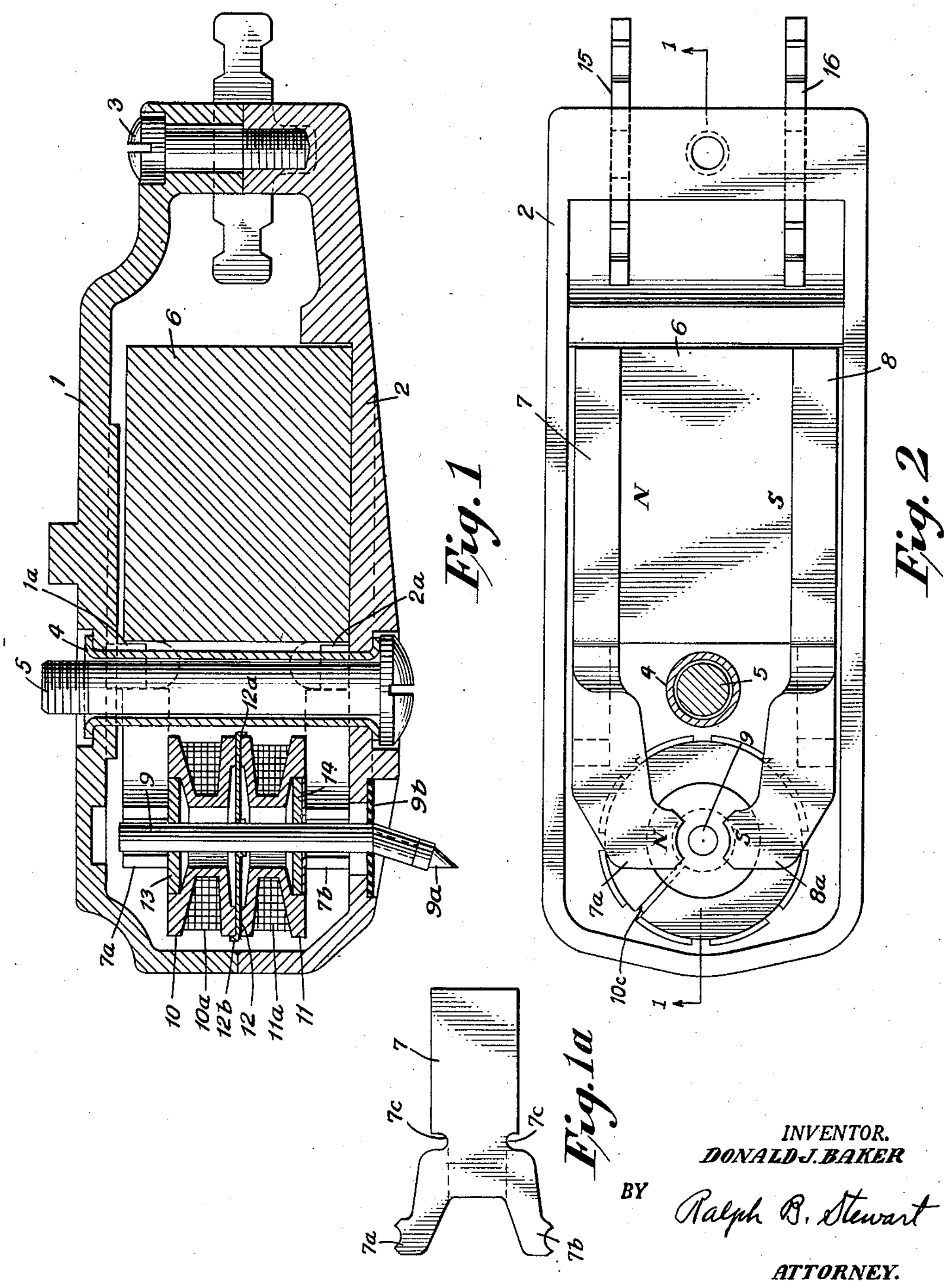
Figure 2 is a plan view of Figure 1 with the top half of the covering removed.

Referring to Figures 1 and 2, the pickup head has a casing, preferably formed of molded insulating material, and being divided along a horizontal plane to provide an upper half 1 and a lower half 2. The two casing parts are held together by a screw 3 at the rear end of the casing and a hollow rivet 4 positioned near the front end. The head is secured to the tone arm not shown by means of a screw 5 passing through the hollow rivet 4.

The magnetic structure of the pickup head involves a permanent magnet 6 positioned in a socket formed in the lower half casing 2. This magnet is formed as a short block with the poles on opposite sides of the head as indicated in Figure 2. A pair of identical pole pieces 7 and 8 are arranged in contact with the opposite polar faces of the magnet 6 as shown in Figure 2. Pole piece 7 has two pole tips or extensions 7*a* and 7*b* formed at opposite sides and extending from the left end beyond the magnet 6 as shown in Figures 1 and 2. In a like manner, pole piece 8 is provided with a pair of polar extensions 8*a* and 8*b* arranged in such manner that pole tips 7*a* and 8*a* face each other, and pole tips 7*b* and 8*b* also face each other in the same spaced relation. As shown in Figure 2, the facing surfaces of the pole tips 7*a* and 8*a*, as well as pole tips 7*b* and 8*b*, are curved to be concentric with the magnetic armature 9 which is formed as a circular magnetic rod mounted with its axis in a vertical position and equally spaced with respect to the pole pieces 7*a*—8*a* and 7*b*—8*b*.

The two pole pieces 7 and 8 with the polar extensions are of identical shape as shown in Figure 1*a*. These pole pieces with the polar extensions may be stamped from flat sheet material in a form like that illustrated in Figure 1*a*, and then the polar extensions 7*a* and 7*b* may be bent along the dotted parallel lines into a position at right angles to the plane of the main body of the pole piece into the positions shown in Figures 1 and 2 of the drawing. The pole pieces 7 and 8 may be held in position by magnetic attraction of the magnet 6, or they may be secured to the magnet by suitable means as by soldering. As shown in Figure 1*a*, each pole piece is provided with notches 7*c* formed on opposite sides thereof which receive positioning lugs 1*a* and 2*a* formed on the casing parts 1 and 2, respectively. These lugs and notches prevent longitudinal shifting of the pole pieces, and they also serve as guides for properly positioning the cover part 1 on the lower part 2.

The unit assembly for supporting the armature and the pickup winding is mounted within the space between the upper pole tips 7*a*—8*a* and the lower pole tips 7*b*—8*b*. This assembly involves a pair of spools 10 and 11, preferably formed of brass, and carrying coils 10*a* and 11*a*, respectively. Between the two spools 10 and 11 is positioned a disk or diaphragm 12 which forms a torsional support for the armature 9. Preferably spools 10 and 11 and disk 12 are slotted as shown at 10c in Figure 2 to prevent the flow of eddy currents therein. Disk 12 is shown in greater detail in Figures 3 and 4, and modifications thereof are shown in Figures 5 to 10, inclusive.

As shown in Figures 3 and 4, the mounting disk 12 is formed of sheet metal, preferably spring metal, such as Phosphor bronze or beryllium copper, and is provided with peripheral flange portions 12*a* which extend upwardly from the disk 12, and intermediate flange portions 12*b* extend downwardly from the disk. As shown in Figure 1, these flange portions engage the outer rims or surfaces of the adjacent end flanges of spools 10 and 11 and serve to keep the two spools in alignment. Furthermore, the two spools and the disk 12 are soldered or otherwise secured together to form a unitary structure by bonding material applied locally to the peripheral portions of the disk 12 and of adjacent end flanges of spools 10 and 11, and the flange portions 12*a* and 12*b* facilitate the making of a good soldered joint between these elements.

As shown in Figure 1, the disk 12 is supported at its peripheral portion only between the adjacent end flanges of spools 10 and 11, and the outer faces of these flanges are recessed throughout the central part of the flanges so that the adjacent end flanges of the two spools engage the disk 12 only at the peripheral edge portion of the disk. This construction permits the central part of the disk 12 to vibrate to a limited extent without engaging the adjacent end flanges of the two spools.

The magnetic armature 9 passes through the center of the disk 12 and is secured to the disk in any suitable manner, preferably by means of an integral sleeve 12*c* formed on a disk 12 as shown in Figure 4. This sleeve may be soldered or otherwise securely bonded to the armature. As shown in Figure 3, the disk 12 is provided with a pair of elongated slots 12*d* and 12*e* formed on opposite sides of the center of the disk to provide a bridge portion 12*f* which supports the armature 9. This bridge portion is arranged longitudinally of the pickup head so as to reduce the stiffness of the armature mounting in the plane in which the armature must vibrate. This bridge portion also provides a certain compliance in a vertical direction to overcome the pinch effect.

A pair of disks 13 and 14, formed of damping material, are mounted on the armature 9 above and below the mounting disk 12 and are preferably positioned within recesses formed in the end flanges of spools 10 and 11 as shown in Figure 1. These damping disks are formed of any suitable damping material, preferably a plastic material, and serve to maintain the armature 9 properly aligned and to damp out undesired harmonic vibrations.

The unit assembly described above, after being centered between the pole pieces, is secured in position in any desired manner, either by cementing or bonding the spools to the pole pieces or to the casing part 2.

The lower end of the stylus 9 extends through a hole formed in the casing part 2 and carries a removable stylus point 9*a* which engages the record.

A thin disk 9*b* of flexible material, such as rubber, surrounds the lower end of the armature 9 and seals the armature opening in casing part 2 against the entry of dirt and dust into the casing.

One end of the coil 10*a* is grounded to the spool 10 while the other end is connected with a terminal element 15 mounted at the rear of the casing. In a like manner, one end of coil 11*a* is grounded to the spool 11 while the other end is connected to terminal 16. Thus, the two coils 10*a* and 11*a* are connected in series between terminals 15 and 16 and constitute the pickup winding of the head.

From the foregoing it will be understood that spaced pole tips 7*a*—8*a* at the upper end of the armature 9 are of opposite polarity, and spaced pole tips 7*b* and 8*b* at the lower end of the armature are also of unlike polarity, with like poles of each pair being positioned on the same side of the armature. With the armature 9 centered between the two pairs of pole tips, the flux threading the pickup winding will be at a minimum. When the armature is deflected to one side, it will conduct flux from the north pole of one pole tip pair to the south pole of the other pair, and when the armature is deflected in the opposite direction, the flux through the armature will reverse. Thus, an alternating voltage will be induced in the pickup winding corresponding to the vibrations of the armature.

Figure 5:
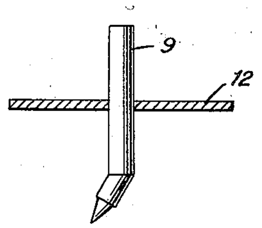
Figures 5 and 6 show an alternative arrangement for mounting the armature, Figure 5 being a sectional view of Figure 6 taken along the line 5—5.
Figure 6:
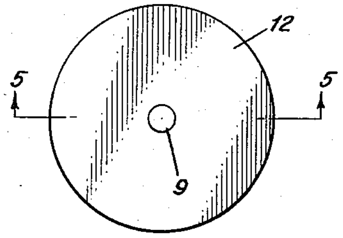

In Figures 5 to 10, inclusive, I have shown modified forms of the torsional mounting disk or diaphragm for the armature. In Figures 5 and 6 the disk 12 is a solid disk without the slots 12*d* and 12*e* and without the peripheral flanges.

In Figures 7 and 8 I have shown how the solid disk may be provided with circular corrugations to decrease the stiffness of the mounting.

In Figures 9 and 10, I have shown a composite disk formed of a flat metal ring 12′ having a rubber disk 12*g* molded around the armature 9 and around the inner portion of the ring 12′. The molded rubber part provides a resilient torsional mounting for the armature.

In Figures 5 to 10 the disks 12, or ring 12′, would be arranged between the spools 10 and 11 as in Figure 1, and the spools and disk or ring would be soldered or otherwise bonded together at their adjacent peripheral edges.

It may be noted that the armature 9 has a round section. This form is preferred since it makes it possible to use a smaller spool and a smaller winding; in other words, by using a round armature, spool and winding, the hole in the spool may be made smaller and the winding will be located closer to the armature, thereby providing a greater inductive action than in case the armature had a square section. It will also be noted that the pole faces of the pole pieces are curved to provide a uniform air-gap between the armature and the pole pieces. While I have shown the armature 9 as being formed of a solid piece, it may be formed of a round tubular piece in order to reduce the mass of the armature.

Where the spools 10 and 11 are formed of non-metallic material, such as plastic material, it will not be necessary to slot them to prevent the flow of eddy currents, but in this case the end of one coil must be connected directly to the end of the other coil instead of being connected to the spools as explained above.

It will be obvious to those skilled in the art that various modifications may be made without departing from the principle of my invention. It will also be understood that while the construction described and illustrated is especially useful as a pickup head, it may also be employed as a recording head.

I claim:

1. A unit assembly for a pickup head construction comprising a pair of metallic spools, each carrying a coil and arranged in axial alignment, a metal disk interposed between said spools and being bonded to said spools by bonding material applied to the peripheral edge portion thereof and to the peripheral portions of the abutting end flanges of said spools, said disk being supported at its peripheral portion only and the adjacent end faces of said spools being spaced apart over the central portion of said disk to permit limited vibration of said central portion without engaging said faces, and a magnetic armature passing through the center of said disk coaxially of said spools and being secured to and supported by said disk.

2. A unit assembly for a pickup head construction comprising a pair of spools, each carrying a coil and arranged in axial alignment, a resilient disk interposed between said spools and having the peripheral edge portion thereof bonded to the adjacent peripheral portions of said spools, said disk being supported at its peripheral portion only and the adjacent end faces of said spools being spaced apart over the central portion of said disk to permit limited vibration of said central portion without engaging said faces, and a magnetic armature passing through the center of said disk coaxially of said spools and being secured to and supported by said disk, said resilient disk being provided with segmental cylindrical flanges at its peripheral edge, said flanges extending alternately to opposite sides of said disk and serving to embrace the peripheral edges of adjacent end flanges of said spools.

3. A unit assembly for a pickup head construction comprising a pair of spools, each carrying a coil and arranged in axial alignment, a resilient disk interposed between said spools and having the peripheral edge portion thereof bonded to the adjacent peripheral portions of said spools, said disk being supported at its peripheral portion only and the adjacent end faces of said spools being spaced apart over the central portion of said disk to permit limited vibration of said central portion without engaging said faces, and a magnetic armature passing through the center of said disk coaxially of said spools and being secured to and supported by said disk, the adjacent end faces of said spools located on oppostie sides of said disk being recessed throughout their central portion, whereby said spool ends have contact with said disk only over a relatively narrow annular band at the peripheral edge of said disk.

4. A unit assembly according to claim 3 wherein said resilient disk is formed with a metallic peripheral portion supported between the adjacent end flanges of said spools and a non-metallic central portion supporting said armature.

5. A unit assembly according to claim 3 wherein the outer end faces of said spools are recessed over their central portions to provide cavities at opposite ends of said spool assembly, and a plate-like piece of damping material positioned within each of said cavities and surrounding said armature in close fitting relation.

6. A unit assembly according to claim 3 and including a pair of disks of damping material surrounding said armature above and below said mounting disk, and means for securing the peripheral portions of said damping disks to said spools.

7. A unit assembly according to claim 3 wherein said resilient disk comprises a metallic disk provided with circular corrugations and having the peripheral edge thereof secured between said spools.

DONALD J. BAKER.

REFERENCES CITED

The following references are of record in the file of this patent:

UNITED STATES PATENTS

| Number | Name | Date |
|---|---|---|
| 1,591,233 | Peterson | July 6, 1926 |
| 1,760,647 | Hopkins | May 27, 1930 |
| 1,779,247 | Parker | Oct. 21, 1930 |
| 1,794,915 | Mittell | Mar. 3, 1931 |
| 1,831,787 | Goudy | Nov. 10, 1931 |
| 1,835,072 | McClatchie | Dec. 8, 1931 |
| 1,960,007 | Harrison | May 22, 1934 |
| 2,019,000 | DelPonte | Oct. 29, 1935 |
| 2,057,621 | Norton | Oct. 13, 1936 |
| 2,092,884 | Kendall | Sept. 14, 1937 |
| 2,133,815 | Harrison | Oct. 18, 1938 |
| 2,201,735 | Loeb | May 21, 1940 |
| 2,240,918 | Vermeulen | May 6, 1941 |
| 2,247,640 | Nielsen | July 1, 1941 |
| 2,336,241 | Gravely | Dec. 7, 1943 |

FOREIGN PATENTS

| Number | Country | Date |
|---|---|---|
| 371,975 | Great Britain | May 5, 1932 |
| 520,447 | Great Britain | Apr. 24, 1940 |